Feb. 2, 1971     J. H. LEMELSON     3,559,257

MACHINE CONTROL APPARATUS

Filed March 12, 1968     4 Sheets-Sheet 1

*INVENTOR.*
JEROME H. LEMELSON

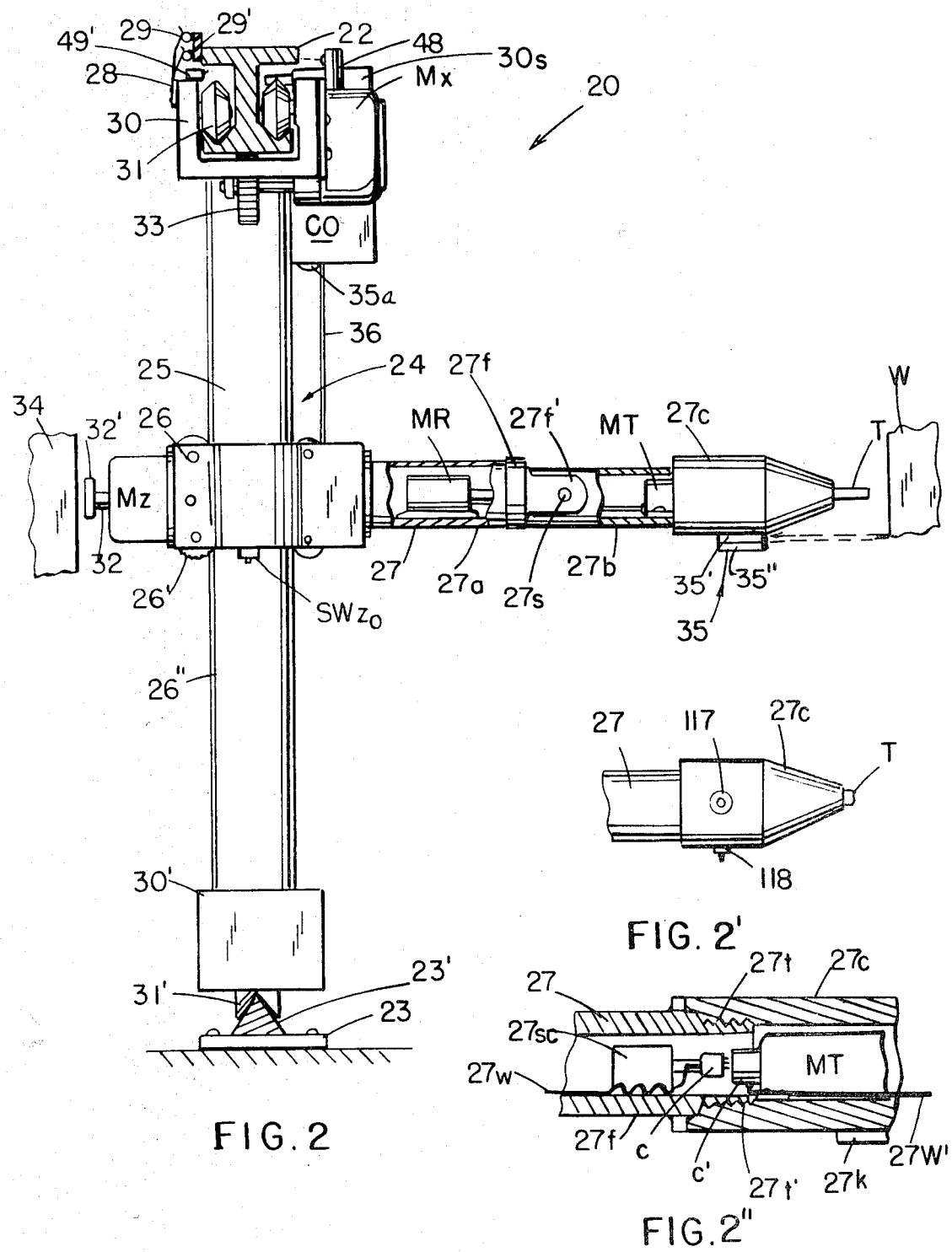

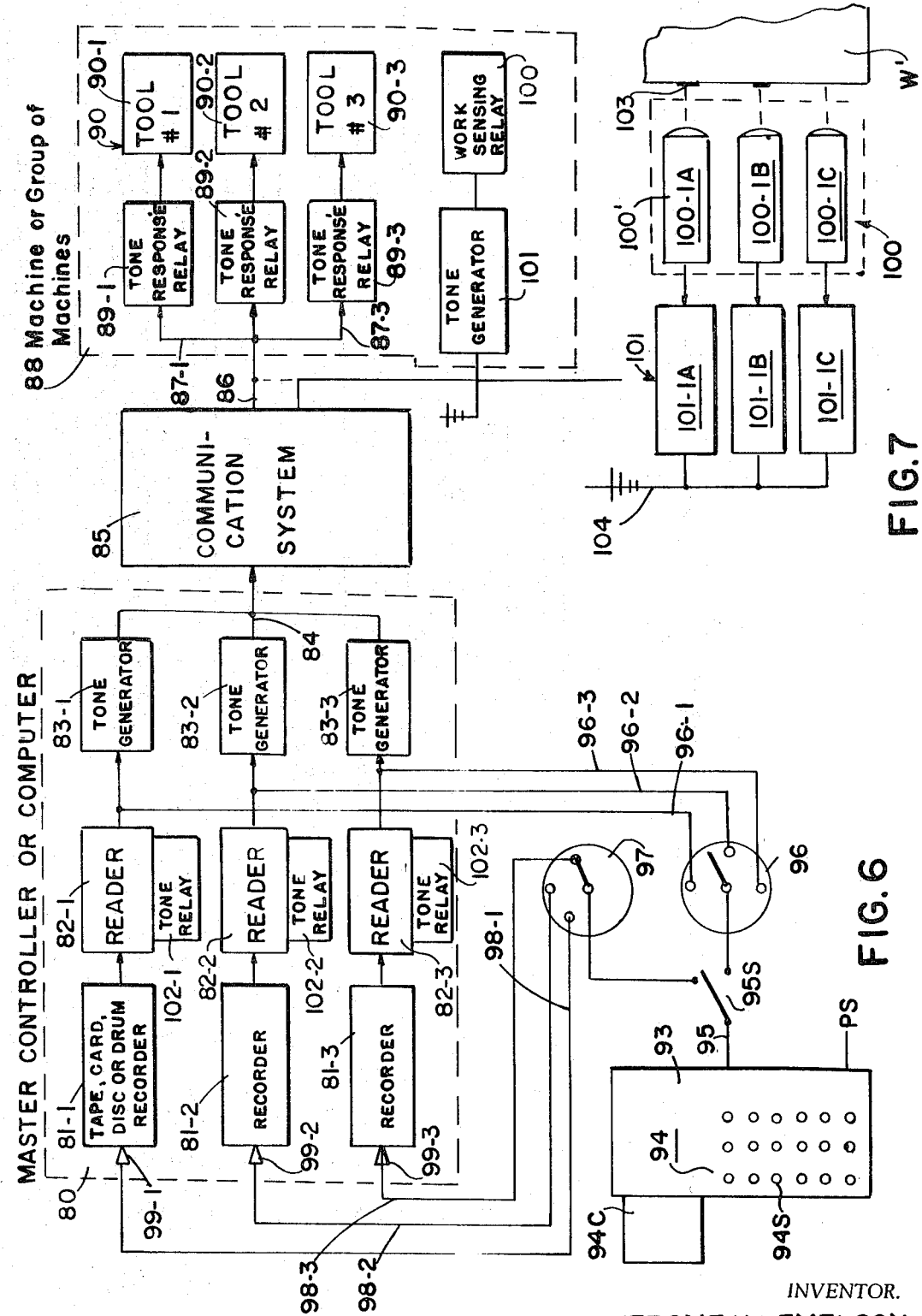

United States Patent Office 3,559,257
Patented Feb. 2, 1971

3,559,257
MACHINE CONTROL APPARATUS
Jerome H. Lemelson, 85 Rector St.,
Metuchen, N.J. 08840
Continuation-in-part of application Ser. No. 387,954, Aug.
6, 1964, now Patent No. 3,372,568, which is a continuation-in-part of application Ser. No. 219,357, Aug. 13, 1962, which in turn is a continuation-in-part of application Ser. No. 557,415, Apr. 10, 1956, now Patent No. 3,049,247. This application Mar. 12, 1968, Ser. No. 717,065
The portion of the term of the patent subsequent to
Mar. 12, 1985, has been disclaimed
Int. Cl. B23q 91/00
U.S. Cl. 29—33                                                8 Claims

ABSTRACT OF THE DISCLOSURE

A control apparatus and method for machines such as production machine tools and work transfer machines, are provided to permit automatic machine tool operation. In one form, a plurality of machine tools or operating portions of a single machine tool are remotely controlled from a computer to simultaneously operate on the same or different articles of work by the simultaneous generation of command control signals. Means are provided at each tool or operating component thereof for discriminating between different simultaneously generated messages so that the message destined to control the machine tool or component may be utilized without interference from other messages.

---

The invention is also concerned with machine tool control message generating means and input means thereto. Means are provided for remotely controlling one or more machine tools by either reproducing prerecorded command control messages from a computer or generating such messages by a manually operated input device. Command control messages may be entered into the storage device of the control computer prior to or during the generation of control signals thereby for controlling one or more machines so that simultaneous input and output functions may be performed to reduce down time.

The control apparatus and method comprising this invention is also applicable for the simultaneous remote control of a plurality of work-handling manipulators per se or forming part of a system which includes machine tools serviced by said manipulators.

RELATED APPLICATIONS

This is a continuation-in-part of my application Ser. No. 387,954 filed Aug. 6, 1964, for Automatic Production Apparatus and Method now U.S. Pat. 3,372,568 which in turn was a continuation-in-part of application Ser. No. 219,357 filed Aug. 13, 1962 (now abandoned) which in turn was a continuation-in-part of application Ser. No. 557,415 filed Apr. 10, 1956, now U.S. Pat. 3,049,247 having as a parent application Ser. No. 477,467 filed Dec. 24, 1954, now abandoned.

SUMMARY OF THE INVENTION

This invention relates to a system for automatically controlling machinery such as machine tools and article manipulators utilized in producing and handling work in process.

It is known in the art to control machines such as metal-cutting machine tools, inspection machines and manipulator transfer devices by automatic control means such as a computer or numerical control device. Heretofore, such control has been effected by means of locating such a computer or control device at the machine and programming same by either predeterminately depressing a plurality of push-button input means or causing recordings on a tape or punch cards to be reproduced to thereby control one or more servo motors associated with the machine. While such a control arrangement is suitable for performing individual operations on work in process, a substantial amount of labor and time is devoted to the prepositioning and transfer of work in process to each machine before completion of an article of manufacture or product is effected. Such intermediate operations generally result in substantial production delays and reduce the total operational time of the machines. Furthermore, when it is desired to operate the machines to perform on different articles of manufacture, the machines must be reprogrammed or their command recordings changed to account for the new operations required.

Accordingly, it is a primary object of this invention to provide a machine controlled system and method whereby a single command controller or computer and a communication system therefore cooperatively arranged to permit said single computer to operate a plurality of machine tools.

Another object is to provide a production system including a plurality of machine tools which may be simultaneously remotely controlled to perform different operations on work in process by means of signals simultaneously generated from a single command control computer.

Another object is to provide a new and improved control system for machines employing simultaneously generated signals or messages each of a different frequency or frequency range and all or certain of which are transmitted on a common carrier or communication channel to a plurality of different machines and/or different operating components of a single machine for simultaneously operating said machines and/or components without interference in the control of said machines by the separate messages.

Another object is to provide a remote control system for an automatic machine tool which system may operate to control a specific tool either by reproducing commands which have been prerecorded on recording members which commands are generated by manual input means.

Another object is to provide an automatic control system for machines having an output for command control messages operative to control one or more of said machines and a manual input means which may be simultaneously operated to record messages at the same time the output means is activated by reproductions of messages which have been previously recorded.

Another object is to provide an improved automatic control system for a plurality of programmable, electrically operated machines situated remote from a source of input commands for selectively controlling said machine and to perform various production, inspection, maintenance and article handling operations.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

FIG. 2 is a side view of one form of machine or tool which may be controlled by the system defined in FIG. 1;

Figure 1:
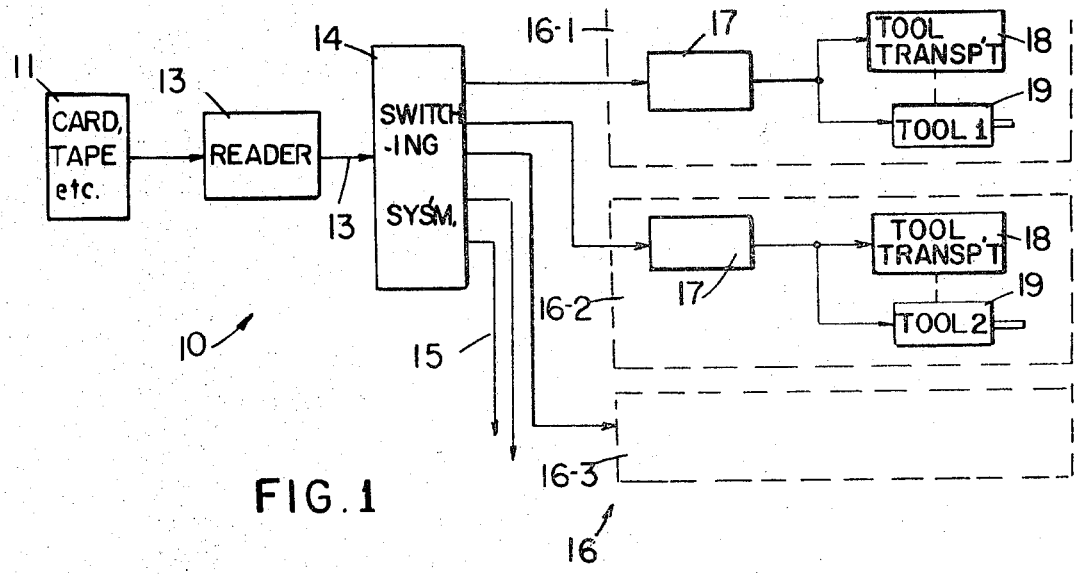
FIG. 1 is a block diagram of an automatic machine control system broadly defining aspects of the instant invention.
Figure 4:
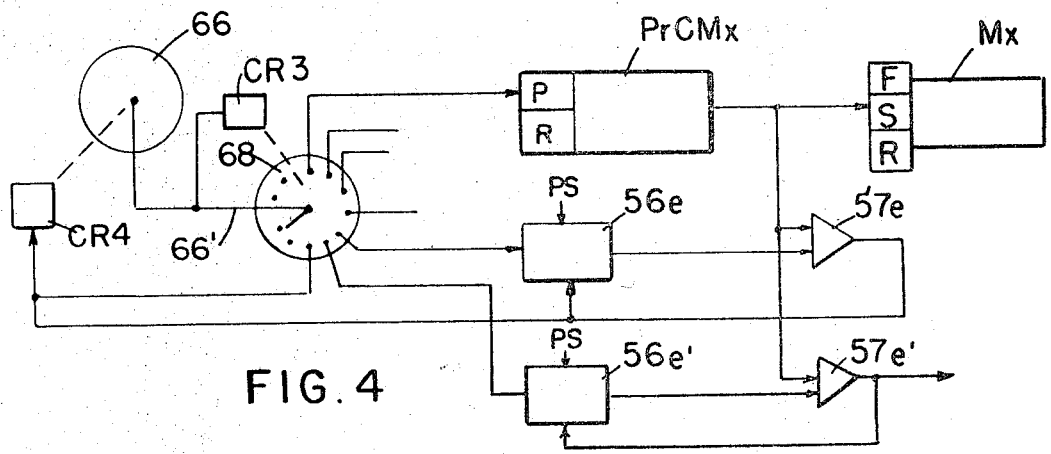
Figure 5:
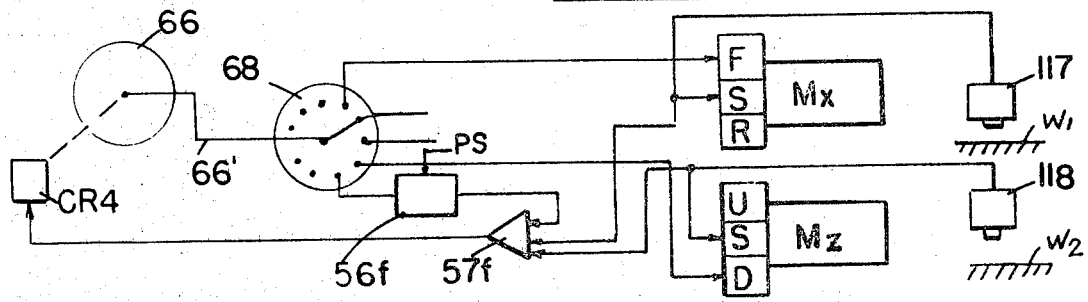
Figure 3:
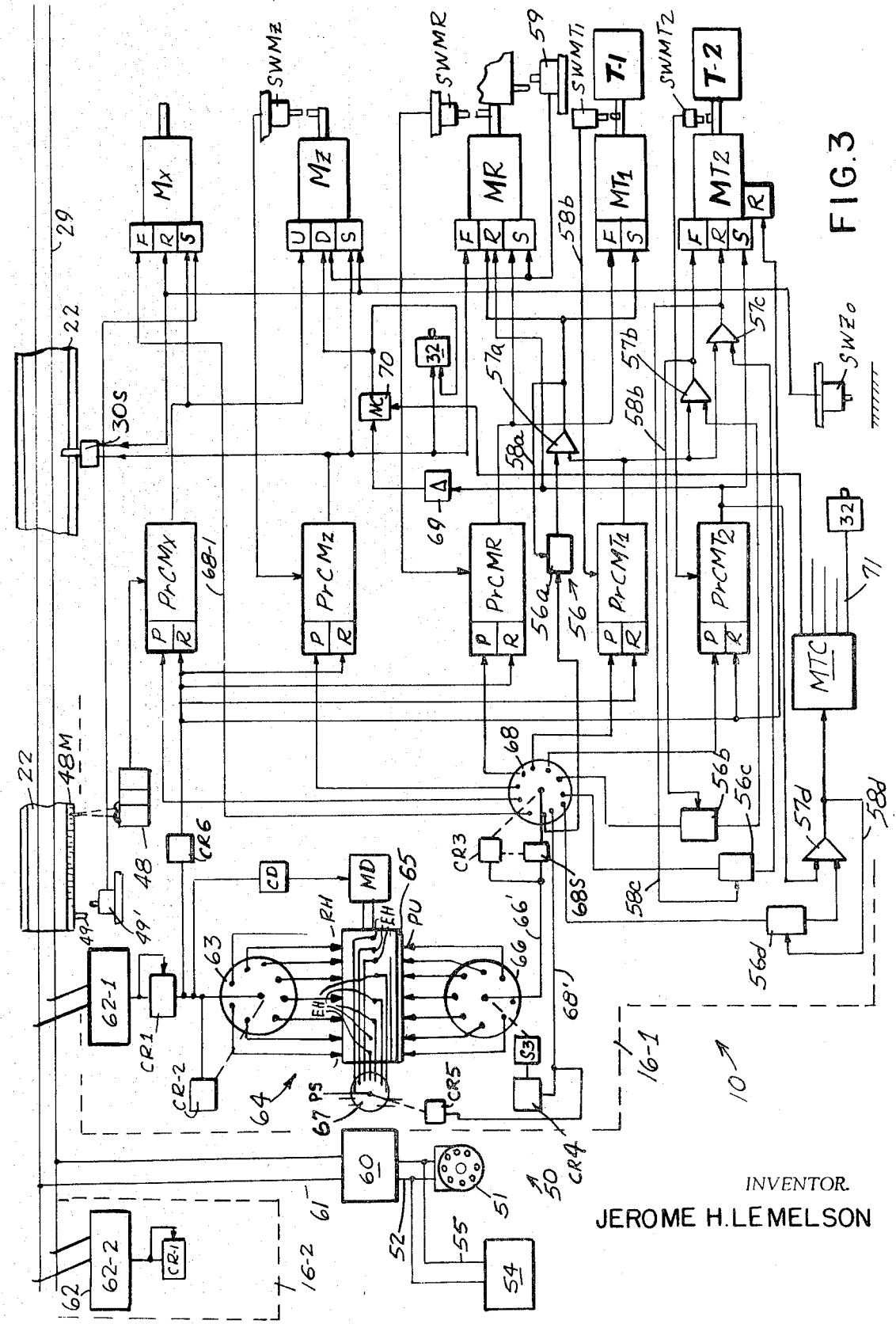

FIG. 2' illustrates modified features applicable to the machine illustrated in FIG. 1;

FIG. 2" is a fragmentary view with parts broken away for clarity of a coupling means applicable to the apparatus of FIG. 1;

FIG. 3 is a schematic diagram illustrating further details of an automatic control system of the type illustrated in FIG. 1;

FIG. 4 is a schematic diagram showing further modifications to a system of the type illustrated in FIG. 3;

FIG. 5 is a schematic diagram showing further modifications to the system shown in FIG. 3.

For the purpose of simplifying the drawings and description to follow it is assumed that, where not shown, the correct circuit power supplies, diodes, and the like are provided on the proper sides of all motors, switches, relays, solenoids, counters, and similar devices used for control. Also, any mechanical features or devices not illustrated are assumed to be provided in accordance with available conventional components or assemblies or are illustrated in greater detail in one of my said copending applications.

Provided and described hereafter are systems for effecting the automatic and remote control of one or a plurality of power operated devices which are electrically controlled by remotely generated digital recordings comprising portions of what will be referred to as command control messages. A command control message is defined as one made up of different message units each of which is a portion of the entire message and contains, in addition to one or more discrete groups of digital signals or pulse trains, one or more digital and/or tone signals operative to effect the selective gating of a command control portion of said message unit to a particular controller or control device in the system for activating or presetting said control device. The separate messages may thus each comprise (a) a series of pulse trains or digital codes generated as electrical signals of the same frequency, (b) a series of pulse trains or codes having interposed between certain of said codes, tone signals of different frequencies which are operative to energize different code responsive or tone responsive relays in the control system for gating a respective portion or code unit of the remainder of the message to a respective control device for energizing or presetting same in accordance with the digital value of the gated code or (c) a series of tone signals of different frequencies with certain of said tones being operative to effect the gating of other tone signals to preset or energize controls in the system responsive only to respective tone signals. Thus, while the switching means described hereafter may be defined as code responsive or coded relays responsive to code portions of the command control message, they may also comprise tone relays responsive to specific frequency tones disposed between other digital code, pulse train or tone portions thereof operative to effect control of the operation of the tool and the motor means positioning the tool relative to the work on which it performs. Command control messages may also be composed of different codes or control tones which are transmitted simultaneously in which said codes comprise pulse trains or groups of digital signals each of a different frequency. The groups of tones or tone codes may be recorded as they are transmitted on a single channel of the magnetic recorder of the machine or station to which they have been gated and separated thereafter by the proper filter means so that they may be independently used for control of respective servo or filtered from one another and independently recorded on different channels of a multi-channel recorder or utilized upon separation from the single signal to preset respective predetermining means as described hereinafter.

There is shown in FIG. 1 elements of an automatic production system or apparatus 10 having a plurality of power operated tools and devices each of which is remotely controllable to perform a specific function or functions relative to work-in process, equipment or facilities in operation. At a location remote from said power operated devices, a source 11 of input command signals is operatively connected to a scanning device 12. The command signals which control one or more of said power operated devices maybe provided as digital recordings or the like on one or more of a plurality of cards, tapes, discs or other recording media which are scanned by photoelectric, magnetic, mechanical switches or other scanning means provided in apparatus 12. The result of scanning is generated at a plurality of digital signals on the output 13 of 12 which are transmitted as one or more command messages which are individually transmitted and routed to respective receivers associated with selected of the plurality of power operated devices.

Transmission of the signals generated on the output of scanner 12 may be accomplished by wire or short wave means. In FIG. 1 the output 13 is connected by wire to a switching system 14 such as an automatic telephone switching system which is operative by the first portion of the message generated in 12 to effect switching of the remainder of the message on a selected of a plurality of outputs 15 thereof to a selected machine or tool station designated by the general notation 16. In other words, a plurality of tools or tool stations designated 16–1, 16–2, 16–3, etc. may be provided in the system 10 illustrated in FIG. 1, any one or more of which may receive a particular command control message in accordance with the switching and connection portion of the message which is first generated and transmitted to switching system 14. Each of the plurality of tools or power operated devices includes a receiver-controller 17 which is operative to receive and record or otherwise utilize command control messages destined to automatically control the machine tool or device associated therewith. The receiver and controller 17 of each tool preferably includes a recording means for a plurality of command control messages and means presettable by a particular message for predetermining the operation of a tool transport means 18 and the tool 19 itself. The transport means 18 may comprise one or more motor driven fixtures for prepositioning one or more power operated devices in sequence with their operation as controlled by the output of 17. The power operated devices for each unit or station 16 may vary from single or multiple open-loop tools such as motor driven drills, riveters, welding tools, mills, buffers, grinders, material applicators such as sprayers or the like. They may also comprise assembly and/or disassembly tools for fasteners or components associated with a machine, component or work-in process which is positioned in the realm of operation of the power operated devices. Other open-loop devices may also include scanning and inspection machines and apparatus such as X-ray, ultrasonic, electron-beam or other radiant energy devices operative to inspect a predetermined portion of a work piece or assembly or to machine, weld, or otherwise operate thereon in accordance with movement and operation thereof as controlled by the command control message or messages transmitted to the receiver and controller 17.

Tools of the type described may also be operative in a closed-loop system which includes one or more feedback signal generating means operative in response to signals generated with the movement of the tool, its operation and/or by scanning that portion of the work affected by the tool or device.

There is shown in FIG. 2 an automatic production tool and a transport or positioning means therefore which is applicable to perform various operations controlled by command signals generated remote therefrom. The automatically operative apparatus 20 includes guide means for a tool assembly 24 in the form of an overhead mounted track 22 and a floor mounted track 23 extending adjacent to one or more work pieces or assemblies W disposed along the path of the parallel tracks. The tracks 22 and 23 may be fixed within a given work area and may comprise one of a plurality of such tracks, each mounting a respective tool assembly such as 24 or may be mounted on a further frame or tool base which is moveable to a particular production or maintenance location by automatic or manually directed means.

Supporting the assembly 24 from above is a first carriage 30 having a plurality of wheels 31 rotationally supported thereon which ride in respective V-shaped grooves in the bottom legs of the I-beam shaped track 22 along which the tool assembly 24 is moveable for positioning the tool thereof at different locations defined by the extension of tracks 22 and 23. Extending between the upper carriage 30 and a lower carriage 30' is a vertical fixture or column 25 supporting a second carriage 26 which is moveable up and down along 25. A first motor Mx is mounted on carriage 30 and is operative to drive said carriage longitudinally along track 22. The output shaft of gear motor Mx mounts a drive wheel 33 which may frictionally engage the lower surface of track 22 or may contain a plurality of teeth engaging a spur gear portion of the lower surface of track 22 (not shown). Notation 31' refers to a single wheel having a wedge-like peripheral indentation which rides on a wedge-shaped upwardly extending portion 23' of track 23 for supporting the assembly 24 in fixture relation thereon.

Carriage 26 is driven up and down on column 25 by any suitable electrically controllable drive means mounted either on said carriage or the remainder of the assembly. In FIG. 2, a plurality of toothed wheels 26' are shown rotationally mounted on carriage 26 and are driven by a motor Mz also mounted thereon, to engage one or more spur gear toothed portions. Shown laterally extending from carriage 26 is a fixture assembly 27 including a first arm 27a and a second arm 27b mounted for movement relative to 27a and the carriage 26 to which is secured at its other end. A fitting 27f containing a plurality of fork-like elements 27f' pivotally supports arm assembly 27b on a shaft or pins 27s and a motor MR mounted within arm 27a is operative to pivot arm 27b about the axis of aligned pins 27s under the control of the computing means to be described. Mounted near the end of arm 27b is a tool assembly 27c containing a tool or other power operative device defined by the notation T. The tool assembly 27c is preferably removable from the end of 27b as shown in my said applications of which this is a continuation-in-part, so as to permit different tools to be operated by the apparatus illustrated by the performance of minor changeover functions therefor.

In addition to the provision of one or more work pieces, machines or assemblies W disposed at different locations adjacent to track 22 to be selectively operated on by the tool T of the assembly 24 in accordance with a programmed sequence of movements and operations, a means 34 in the form of one or more assemblies or supports is provided adjacent one or more of the work members W or extending parallel to the track 22 which serves as a bucking member for the tool. Notation 32 refers to the shaft of a lineal servo mounted on or within the housing which supports motor Mz and operative to be projected against the adjacent surface of 34 during the operation of the tool to serve as a support or bucking means for the tool and/or a means for prepositioning said tool relative to the work. The head 32' at the end of shaft 32 engages member 34 and transmits axial forces directed therethrough from the tool to member 34. Operation of 32 to project against 34 is preferably program controlled by the same means controlling the various servo motors such as Mx, Mz, MR and MT.

Notation CO refers to a housing in which are mounted all of the components which are operative to control both prepositioning and operation of the one or more tools mounted on the assembly 24 in accordance with a programmed input originating on one or more command control messages transmitted thereto from a remote location as will be hereinafter described.

Other features of the apparatus of FIG. 2 includes a plurality of wires 29 which are supported off track 22 by a plurality of insulating spacers 29'. Notation 28 refers to an assembly of slides or brush elements which are insulatedly supported by carriage 30 and moveably engage respective of the plurality of wires 29 for the transmission of electrical energy to the various servo motors mounted on assembly 24 and of signals operative to control said motors.

Notation 35a refers to a reel of electrical cable 36 extending between CO and the various motors mounted on the carriage 26 and the tool assembly 27 extending therefrom. The retracter 35a is operative to retract cable 36 when carriage 26 moves upwardly and to permit the paying out of cable when the assembly moves downwardly.

Scanning and switching controls for the apparatus 20 which will hereinafter be described in greater detail, include a photoelectric cell-relay 48 mounted on carriage 30 and operative to scan a grid, marks or reflective markers disposed along the edge of the upper leg of the I-beam track 22. Mounted on the other wall of carriage 30 is a limit switch 49' adapted to be activated by a pin or pins projecting from track 22. Either or both these scanners may be mounted on the lower carriage 30' to define means for controlling movement of the assembly 24 along the path defined by both tracks. A photoelectric scanning relay 35 is shown secured to the housing 27c for the tool disposed at the end of arm assembly 27 and is operative to scan and detect the work surface, portions thereof, reflective markers or other means disposed on or adjacent to the work or its holding fixture. The relay 35 preferably includes a photoelectric cell disposed in a first housing or compartment 35' adjacent to a light source disposed in a second compartment 35'' and adapted to project a beam of light substantially parallel to the scanning axis of the photoelectric cell so that the cell may become energized upon detecting the light from said light source after its reflection off the surface of the work being scanned. The photoelectric relay 35 may be utilized for merely detecting the appearance of a portion of the work piece such as an edge thereof as it comes into alignment with the projected light beam. It may also be utilized for effecting fine adjustment and positional control of the tool positioning fixture in scanning narrow retro-reflective markers or grid lines disposed on a reflex reflecting surface such as the commercially available Scotch Lite.

FIG. 2' illustrates the fixture assembly 27 of FIG. 2 modified with a plurality of limit switches mounted on and projecting in different directions from the tool housing 27c. A first limit switch 117 is adapted, with its actuator arm projecting laterally and horizontally outward therefrom, to engage a vertical surface of a work piece, housing of a machine or the like. A second limit switch 118 is mounted on 27c with its actuator arm projecting vertically downward and is adapted to effect automatic control of the apparatus as will hereinafter be described when it engages a horizontal surface such as the top of the work piece or a lateral projection thereof. Other means may also be utilized for sensing work-piece or work-mount surfaces such as magnetic means or means such as photoelectric relay 35 adapted to detect the reflection of a light source off the surface of the work piece.

As stated, the tool or device positioned by the apparatus 20 in the realm of movement of the arm assembly 27 may comprise various forms of electrically controlled power operative devices for performing one or more of a plurality of production machining, assembly or inspection functions, material handling or maintenance functions. These devices may include various tools adapted to shape or machine the work such as drills, mills, saws, grinders, buffers, punchers and shapers or the like; various assembly devices including welding tools, riveters and other fastener applicators adapted to be automatically prepositioned and operated in a programmed fashion on the work; various inspection devices including radiation devices such as light, X-ray, magnetic field measurement, electron beam measurement and cathode ray devices such as a television camera or photomultiplier device and various maintenance tools including wrenches, screwing and unscrewing devices, manipulators for valves, dials and arms projecting from the piping or devices to be controlled thereby; manipulator jaws or the like.

Notation MR in FIG. 2 refers to a motor operative to pivot the arm 27b on arm 27a. This servo may also be operative to project and retract 27b with respect to 27a or to rotate 27b about the longitudinal axis of 27a. In other words, various combinations of rotary and lineal servo devices are conceived as applicable to the arm assembly 27 as illustrated or to various modifications thereof depending on the production functions required of the apparatus. If servo MR is a gear motor operative to rotate 27b about the longitudinal axis of arm 27a, then the automatic control means described hereinafter may be operative to effect the automatic assembly and disassembly of various tool housings and the different tools held thereby with the end of 27b, particularly if assembly is effected by threading means in which 27c is screwed onto the end of 27b. A fixture for holding a plurality of tools located in different housings 27c may be prepositioned relative to the track way 22 so that command message control of the operation of motor Mx after controlling Mz to position 26 at the proper height, may be operative to effect the disassembly of one tool housing 27c already mounted on the end of 27b and its placement in a predetermined location on said fixture and the automatic assembly thereon of a selected tool housing which is at a predetermined location on said fixture.

FIG. 2″ shows details of the coupling means at the end of fixture assembly 27 such as arm 27b operative to both secure the tool assembly 27c thereto and electrically connect the devices secured therein to the electrical circuitry of the fixture 27 and the power and control means located in housing CO. The arm or column defining the end of assembly 27 is threaded at its end at 27t for removably securing it to the threaded end 27t' of tool housing or mount 27c, which function may be performed automatically as described by rotating either or both assemblies after their signal controlled alignment with each other. Electrical connection of components such as MT or others mounted within housing 27c may be effected by the provision of aligned contact members at the end of 27 and within 27c which engage each other to connect respective circuits of both assemblies when the proper degree of relative rotation of both is effected. In FIG. 2″ a push-pull, bistable solenoid 27sc is secured within 27 near the end thereof and mounts a pluggable electrical connector C at the end of its shaft, which connector is adapted to engage a receptacle or female electrical connector C' secured within 27c upon assembly of 27 and 27c by the projection of the shaft of solenoid or lineal servo 27sc. A signal operative to project said shaft may be derived from the programmed command control sequence as will be hereinafter described. Thus the multi-circuit cable 27w extending along the interior of fixture or arm 27 is electrically connected to respective lines of a cable 27w' associated with housing 27c. Line 27w is shown slack or coiled at its end to permit it to be advanced and retracted with movement of the shaft of the solenoid and line 27w' may contain power and control circuits operative to energize the various electrical devices such as tool servo MT associated with assembly 27c. Notation 27k relates to a key or shaped portion of the housing 27c which projects therefrom and is used for aligning and retaining said assembly in its storage fixture and/or tool used to rotate and assemble same with 27.

Other features of the apparatus of FIG. 2 include the provision of a servo or solenoid operated means for engaging and locking the carriage 30 against the track 22 to steady and preposition the tool carrier assembly 24 during the performance of a particular production operation thereof. Notation 30s refers to a solenoid mounted on the sidewall of carriage 30 having an actuator arm adapted to project and engage the main rib of the I-beam track. Such a device, which may also be mounted on the bottom carriage 30' for the engagement of track 23, may be automatically controlled to engage and disengage said trackway by respective portions of the command control message, prior to and after tool operation on the work in a predetermined cycle as described hereinafter.

FIG. 3 illustrates further details of a system employing one or more remotely controlled tools or devices as described. A source of command control messages is operative at a station or console 50 which is situated remote from the power operated devices controlled thereby. Said messages may be generated by manual means including a dial operated or push button digital pulse train generating device 51 or a code generating device 54 such as the described card, tape, disc or drum reader having recording elements contained said command control messages which are sequentially scanned in the reader to generate said message electrical signals. The outputs 52 of 51 and 55 of 54 are connected to a signal transmitter 60 which is operative to transmit by short wave or wire 61 the outputs of devices 51 and 54 to a plurality of receivers for power operative production devices 16–1, 16–2, etc.

Assuming that the command control message generated on the output of transmitter 60 is destined for the power operated devices associated with station 16–1, said message is received by the receiver 62–1 thereof as well as the other receivers 62 of the system but is only gated to the control apparatus coupled to the output of receiver 62–1, to the exclusion of all other control apparatus in the system, by means of a tone or coded relay CR–1 connected across the output of 62–1. The relay CR–1 which contains a normally open slow-to-close or bi-stable switch, is operative to close said switch in response to a first portion of the command control message which may be a code or tone of such a characteristic as to activate said relay to the exclusion of similar types of relays each connected to an output of a respective of the other receivers 62 in the system. The remainder of the command control message is then operative to perform the following functions:

The next portion or unit code part of the command control message is passed to a second coded relay CR–2 and is utilized to activate said relay to energize the switching input of a rotary stepping switch 63 to step said switch to the next switching position or any predetermined switching position. The output of the receiver 62–1 passes through the rotary stepping switch 63 to a selected of a plurality of outputs thereof each of which is connected to a respective recording head RH of a bank of said heads which are positioned to record messages on respective of a plurality of recording tracks of a magnetic recording drum, disc, etc.

The drum is driven by a servo device MD which, in the apparatus illustrated, is operative in one of two selected modes including constant speed rotation of the drums 65 or stepping rotation of said drum as will be described hereinafter.

A plurality of reproduction heads PU are operatively coupled to the recording channels of drum 65 permitting the recorder 64 to serve as a source of a plurality of command control messages transmitted thereto from station 50 which messages are selectively reproducible therefrom, one after the other or in predetermined sequence, to control the positioning and operation of the one or more power operative devices associated with the assembly or station 16–1, The heads PU are each connected to a respective input of a solenoid or servo driven rotary stepping switch 66, the single output 66' of which is connected to the input of a second rotary stepping switch 68 for distributing portions of the reproduced command controlled message to various predetermining controllers which are operative for controlling the movement and operation of the one or more power operative devices. The switch 68 is stepped to gate the input 66' to the various outputs thereof by means of a third tone or coded relay CR–3 which operates the servo driving the switch 68 in response to portions of the command control message disposed between the other portions thereof which are utilized for controlling the further control devices coupled to the outputs of 68.

A typical cycle of operation will now be described in order to describe the various control components and features of the particular system illustrated in the drawing. A first portion or code unit of the command control message is gated on line 66' through switch 68 to a predetermining controller P$r$CM$x$ which is operative to control a first servo motor M$x$ for positioning the machine tool in a first direction along guide or track 22. It is assumed that carriage 30 is located at a predetermined position on the track 22 as defined by a home position locator stop or pin 49 and a limit switch 49' mounted on the carriage 30, which switch is operative when its actuator arm strikes 49 as the carriage 30 moves to said home position to have stopped motor M$x$ with, for example, an end of track 22. Controller P$r$CM$x$ may be of the code or pulse-presettable type as described in my said copending application, which is operative to receive a pulse or tone code or predetermined number of digital pulses comprising the portion of the command control message gated thereto, which pulses preset the controller or counter whereby it operates thereafter to generate a stop-signal upon receipt of a predetermined number of feedback pulses produced with movement of the carriage 30 along track 22 by a scanning means such as a limit switch or photoelectric cell 48 which scans incremental marks, holes or grid devices 48M along track 22 or disposed on a member positioned adjacent the track, and generates a pulse each time a grid line 48 or pin is so scanned.

The next portion of the command control message is operative to activate code responsive relay CR–3 to step or rotate switch 68 to the next switching position to gate the following portion of the message to a second predetermining controller P$r$CM$z$ which is constructed similarly to controller P$r$CM$x$ and is operative to control the servo Motor M$z$ which drives the tool or tools in a vertical direction for prepositioning said tool in a vertical direction relative to work disposed in alignment therewith as a result of controlled operation of motor M$z$.

The coded relay CR–3 which controls operation of the rotary switch drive element of switch 68 is next energized by a code or tone comprising the next portion of the command message to step the input 66' thereto to an output extending to a third predetermining controller P$r$CMR which controls operation of fixture rotating servo motor MR for angularly positioning the tool mounted portion of the fixture relative to the work described elsewhere herein. The input 66' is controlled by the stepping of switch 66 through CR–4 and S–3. Said servo motor MR may be operative to rotate the entire fixture on its base or overhead mounted carrier or to pivot one or more portions of the fixture and the notation may be representative of a plurality of such motors operative to rotate, project or pivot different portions of the fixture and/or tool.

Further portions of the reproduced digital message are operative to activate the relay CR–3 which effects rotation of rotary switch 68 for gating predetermined portions or units of the message to other controllers for controlling opeation of the tool or tools disposed on the fixture prepositioned by motors M$x$, M$z$, MR etc. The controllers illustrated in FIG. 4 are presented to be illustrative only and their number as well as mode of operation and devices controlled thereby may be varied according to specific production requirements. These controllers include pulse presettable predetermining controllers P$r$CMT–1 and P$r$CMT–2 the function of which will be described and one or more variable control devices MTC which, in their simplest form, may comprise multicircuit timers or the like adapted to gate electrical energy or pulses to the respective of the start and stop controls of the various motors and servos such as M$x$, M$z$, MR, MT–1 and MT–2 in sequence and of a time duration or time separation such that the tool or tools T–1, T–2, etc. mounted on the fixture will be operated in a predetermined manner during a production, inspection or maintenance function and/or will be moved through a predetermined path after being prepositioned as described.

Assuming first that the tool transport means or carrier assembly 24 is located with the carriage 30 stopped at a home position as defined by a pin 49 or other stop located on the track 22 which engages the actuating arm of limit switch 49' mounted on 30 causing said switch to activate the stop control S of motor M$x$, a start pulse comprising a portion of the reproduced command control message is gated through rotary switch 68 and transmitted on an output 68–1 thereof to the start control F of motor M$x$ causing said motor to drive the assembly 24 along track 22 in the direction of the work piece or device which is situated adjacent said track and is adapted to be operated on or scanned by the tool mounted on assembly 24. As carriage 30 travels along 22, photoelectric scanner 48 scans position indicating marks 48M disposed along or adjacent track 22 and generates pulses for uncounting the predetermining counter controller P$r$CM$x$ which has been preset by a portion of the command control message. Upon uncounting, the controller P$r$CM$x$ transmits a control pulse to the stop control S of motor M$x$ and the forward or up-drive control input U of motor M$z$ to cause the carriage 26 to rise from its lowermost position at the bottom of the track defined by vertical member 25. Uncounting of predetermining controller P$r$CM$z$ is effected by means of a switch SWM$z$ positioned to become actuated with rotations or fractions of rotations of the output shaft of gear motor M$z$ and to generate a pulse each time it is so actuated which is transmitted to the uncount input of controller P$r$CM$z$.

Upon uncounting, controller P$r$CM$z$ generates a control pulse which is transmitted to the stop control S of M$z$ and to the start control F of motor MR which rotates the fixture or portion thereof mounting the tool a predetermined degree. Control of MR is effected by a limit switch SWMR generating feedback signals as it becomes actuated by means of a cam mounted on the shaft of the output of gear motor MR, said switch providing feedback, uncounting pulses to the uncount input of predetermining counter controller P$r$CMR. Upon uncounting, controller P$r$CMR generates a pulse which is transmitted to the stop control S of motor MR and to the start control F of motor or tool servo MT–1 which is coupled to tool or power operative device T–1. The output shaft of MT–1 is operative to actuate a limit switch SWMT–1 or operative for sensing the rotation thereof, which generates a feedback pulse and transmits same to the counter controller PrCMT-1 which effects uncounting of said controller. Upon attaining its uncount condition, controller PrCMT-1 generates a control pulse and transmits same to the stop control S of MT-1. For certain fabrication, inspection or maintenance functions it may be merely required to operate the tool, clamp or inspection device T, for a predetermined time interval or degree of movement thereof which will be substantially a function of the number of rotations of the output drive shaft of the gearmotor or servo MR. In other production or maintenance functions employing apparatus of the machine or station 16-1 which is more complex in operation, it may be desired to operate one or more additional servos, tools or inspection devices after tool T-1 has been operated. In FIG. 4 control means are provided for either reversing operation of each of the servos MR, Mz and Mx to cause the respective assemblies moved by each to return to a home position for activating a further tool or tools represented by notation T-1 or for activating one or more predetermining controllers MTC for controlling either or both the tool or transport drive motors in a predetermined cycle whereby the tool or tools move through a predetermined path and operate in a predetermined manner at the location attained by means of the positional control affected by the first portion of the command control message.

Portions of the command control message may be operative to effect the selective operation of certain of the servo motors or power operated devices to the exclusion of others by activating certain control elements to the exclusion of others during a particular control cycle. For example, a single presetting pulse may be gated through switch 68 (whereafter said switch steps to its next position) to any of the predetermined controllers PrCMx, PrCMz, PrCMR, permitting operation of the respective servo controlled thereby for only one rotation or fraction of rotation of its shaft so as to result in little or substantially no movement of the apparatus driven thereby.

Turning now to the operation of predetermining controller PrCMT-1, it is noted that the output of said controller on which the uncount control pulse is gated, is connected to inputs to a number of switching control elements or circuits designated 57a, 57b and 57c. These control circuits are logical AND switching circuits which are each operative to generate a pulse on its respective output when its two inputs are simultaneously energized. Accordingly, the other inputs to the AND control devices 57a, 57b and 57c are connected to respective further control elements or circuits 56a, 56b and 56c any one of which may be energized by a signal portion of the command control message gated thereto from a respective output of the rotary switch 68. In their simplest form, the control devices 56 comprise a bi-stable switch or flip-flop which is operative when energized by a signal passed to its input from switch 68, to gate a power supply (not shown) through 56 to energize the input to the AND switching element 57 connected thereto until the predetermining controller having its output connected to the other input of said AND switching element, uncounts. In other words, if it is desired to reverse the operation of motor MR after motor MT-1 has finished its cyclic function, control element 56a will have been activated by a signal portion of the command control message gated through switch 68 thereto to the exclusion of the activation of control devices 56b and 56c as the result of the switching of 68 past the terminals of the switch connected to the inputs to 56b and 56c without gating signals through said switch thereto. If 56a is so activated, then when controller PrCMT-1 uncounts, the output thereof will only activate AND switching element 57a resulting in the generation of a cotnrol signal on the output of 57a which is passed to the reverse control R of motor MR and to the stop control S of motor MT-1. A time delay (not shown) may be provided in the circuit between 57a and R of servo MR to permit motor MT-1 to stop before the operation of MR, if necessary.

Thus the output of AND switching circuit 57a is utilized to pulse the stop control of servo MT-1 to terminate the operation of the tool T-1 powered or controlled thereby and is also utilized to drive motor MR in reverse to its home position which, when obtained, is operative to activate a limit switch 59 engaging a portion of the fixture driven by servo device MR. Activation of switch 59 is operative to gate a control pulse to the stop control S of MR and to the down drive control D of servo Mz. Activation of control S of servo MR is operative to stop said servo with the fixture driven thereby at its "home" position while activation of D of servo Mz is operative to drive carriage 26 to its lowermost, "home" position on the track associated with the vertical column assembly 25. Upon attainment of said lowermost position by said carriage, a further control limit switch SWZo mounted on either carriage 26 or vertical assembly 25 becomes actuated and gates a power supply or pulse to the stop control S of motor Mz and the reverse drive control R of gear motor Mx resulting in movement of the assembly 20 to the "home" position defined by the track mounted pin 49 at which position limit switch 49' becomes activated and pulses the stop control S of motor Mx resulting in stoppage of the assembly at said home position.

In the event that it is desired to include the predetermined operation of a further tool or power operated device T-2 in the hereinabove described cycle or to perform further predetermined operations including movement of tool or device T-1, the command control message will have been so composed as to have pulsed or activated certain of the other control elements 56b, 56c, 56d, etc. For example, if the command control message is operative to pulse control switch 56b gating a power supply to the AND switching circuit 57b to the exclusion of circuit 57a, then, when controller PrCMT-1 uncounts a signal will be generated on the output of AND circuit 57b which is passed to the forward drive control F of a reversible gear motor MT-2 thereby causing motor MT-2 to drive tool or device T-2 in a first direction. The output of AND circuit 57b is also passed to a resetting or deactivating input of control switch 56b so as to deactivate same once its function has been fulfilled as are the outputs of each of the other illustrated AND switching circuits. In other words, when control switches 56 are so deactivated, the power supply gated to their respective AND switching elements are no longer connected thereto. A feedback signal generating switch SWMT-2 is coupled to operate with rotation of the output shaft of servo MT-2 by means of a cam or other switch energizing device mounted on said shaft and provides feedback pulses to th predetermining counter controller PrCMT-2. Upon uncounting, PrCMT-2 generates a pulse on its output which activates the stop control S of MT-2 and is also utilized to energize either the down drive control D of motor Mz if the tool operating portion of the cycle is to end at this point. However, if it is desired to effect further movement and/or operation of one or more of the power operated tools or devices, the output of PrCMT-2 may be utillized to activate a preset controller MTC such as a multi-circuit timer having a plurality of output circuits which extend to those of the illustrated motor start, stop and reverse controls which are desired to become activated in sequence and at predetermined time delays after the initial energization of MTC to perform the desired operation of the described apparatus. While the multi-circuit controller may be preset or predetermined in its function by a portion of the command control message, it may also be manually preset to perform a predetermined production operation and may comprise but one of a plurality of such cycle controllers which are operative only when a control switch 56d thereafter is activated by a portion of the command control message and energizes an input of an AND switching circuit 57d having its other input extending from the output of controller PrCMT-2.

In order to prevent activation of the down drive control D of servo Mz while the cycle controller MTC is activated, one of the outputs 71 of controller MTC is connected to the switching input of a normally closed switch 70 in the circuit between PrCMT-2 and the down drive control D of Mz to effect the activation of 70 and the opening of said circuit so as not to permit the control pulse generated by PrCMT-2 to energize D of Mz. A time delay relay 69 is provided in the circuit between the output of PrCMT-2 and D of Mz so as to delay the pulse a sufficient interval so that it will appear at the input to switch 70 after said switch has opened. If switch 70 remains closed in the event that controller MTC is not activated, said pulse will be passed directly to D of Mz to effect the termination of the work cycle whereafter the carriage 26 is driven to the lower (or upper) home position resulting in the activation of control limit switch SWZo which stops said carriage at said position and activates the reverse drive control R of Motor Mx resulting in the return of the tool assembly or carrier 24 to the home position defined by pin 49 on track 22.

In the control functions described employing the reproduction of recorded command control messages to preset or energize controls of various predetermining controllers, operation of the multiple channel, endless track magnetic recorder recording medium was assumed to be continuous so as to permit the recording of new control messages while messages already recorded thereon are being reproduced. It is briefly noted that if a complete command control message is recorded on a single channel of the multi-channel recorder and is utilized as described to preset various of the predetermining controllers, the correct portions of said message may be gated to the correct predetermining controller inputs P by the provision of a normally open switch 68S in line 66' which will not pass any portion of the command message destined for the controllers situated beyond switch 68 until the appearance of the leading portion of the message on line 66' which contains a tone or code operative to energize relay CR3. Switch 68S is operatively coupled to CR3 and is closed thereby when the latter is energized and remains closed for a sufficient time interval to pass the longest messages to be gated to the various controllers situated beyond 68. In other words, switch 68S is either slow-to-open-after-closing or may be operative to close as a bistable switch by a portion of the control message gated therethrough. Switch control CR3 as well as the others are assumed to contain, in addition to activating means responsive to respective codes or tones, means for activating the various rotary switches and gates illustrated in FIG. 3 upon receipt thereby of the proper tone or code.

Notation CD refers in FIG. 3 to a coded relay operative to start drum drive motor MD which is preferably a constant speed motor. CD may be activated by either a code or tone portion of the command control message or one generated by an operator at the computer station 50.

While motor MD preferably operates at constant speed to permit the recording of certain messages while others are being reproduced and used for control purposes, it may also comprise a stepping motor operative in response to a coded or tone responsive relay energized by portions of a command control message or signals generated on the outputs of predetermining counter controllers PrCMx, PrCMz, PrCMR, etc. and MTC so that portions of a command control message are reproduced sequentially only after the previously reproduced portions have been operative to preset or energize the previously controlled mechanism.

Notation MR in FIG. 3 may also be representative of any motor adapted to effect operation of the tool transport in a mode other than those modes controlled by motors Mx and Mz. It may comprise a joint rotating motor or one used to project and retract the tool. It may also define servo means for controlling other fixture or tool variables.

In FIG. 3 each of the predetermining counter controllers PrCMx, PrCMz, PrCMR, PrCMT-1, and PrCMT-2 is provided with an input R which, when pulsed, is operative to reset the counter to a null condition. A code or tone responsive relay CR-6 has its output connected to all of the resetting inputs R of the PrC controllers and MT-2 and its input connected to the input side of the switch of relay CR-1. If it is desired to reset the controllers for any reason prior to their operation, such function may be effected by transmission of the proper codes or tones from station 50 to the receiver 62 for energizing relays CR-1 and CR-6.

In FIG. 3, the fixture and carriage locking solenoids 32 and 30s which have been described as to function, are advanced to engage and retain their assemblies against the said respective surfaces by the uncount pulse produced on the output of PrCMz and are each retracted by the control pulses generated respectively on the outputs of switches 70 and SWZo to disengage their retain-members at the end of a work cycle.

The command control signal recording and reproduction apparatus hereinabove described may be modified to include operation where certain tracks of the recording drum 65 are adapted to receive and record command control messages transmitted from computer 54 while other tracks contain recordings already provided thereon by locally recording same or other means and operative to effect predetermined movements and operations of the tool or device associated with the machine being controlled.

In the control function where recordings are transmitted from station 50 and recorded on selected or sequentially available tracks of the recorder 64, automatic signal erasure means may be employed to erase each command control message after it has been reproduced therefrom or during the recording of a new message on the same track. In the event that it is desired to retain certain signal recordings such as those which may be immediately or shortly thereafter reused for repeating a particular controlled action, erasure control may be effected by use of a tone responsive or coded relay gating a power supply to an erasure means such as a head riding on the track just reproduced from, said coded relay being connected to receive the control message and respond to that tone or coded portion thereof to which it is responsive. Notation 67 refers to a rotary stepping switch in FIG. 3 operative to connect a power supply PS with an erase head EH which is riding against the track just reproduced from, when a coded relay CR-5 is activated by a portion of the message reproduced therefrom to effect the last mode of control. The activation of switch 49' signifying the end of a cycle controlled by a particular command message may also be operative to result in erasure of the channel from which said message was reproduced by connecting said switch 48' to activate CR-5 or the solenoid controlled thereby.

In another form of the invention, the described digital or pulse train recordings which are reproduced as part or all of the command control mesages from magnetic drum 65 may be replaced by a plurality of analog type signals which are operative upon being reproduced from the recording member to directly control the movement of one or more of the described fixture or tool motors. Said analog may be transmitted from control console 50 or prerecorded on selected channels of drum 65 and reproduced when needed as the result of the action of one or more signals transmitted from 50 and operative to effect the selective and sequential reproduction of said analog signals to define a particular control cycle. In other words, apparatus of the type described may be operative by controlling one or more servo motors by means of signals recorded on selected and predetermined of the recording channels of the drum 65 which are selectively reproducible therefrom under the control of signals transmitted to the receiving means 62 of the selected station 16 from the computer or other device 54 or the manual signal generating means 51. Assuming that there are $n$ number of predetermined operations which the machine at station 16–1 may perform or be required to perform over a given time interval or to cover all possible production, maintenance and inspection functions, then a similar number of command control messages or analog signals would be recorded on known locations of the recorder such as on known tracks of the drum and each would be selectively reproducible therefrom by transmitting the desired signal or signals to the receiver 62–1 to effect, as described, the stepping of switch 66 to connect its output 66' with that pickup head PU which is operatively coupled to reproduce from the channel or track of the drum having the desired command control message recorded thereon.

For certain fabricating, inspection or maintenance functions utilizing the apparatus hereinabove described it may be desired to perform a plurality of propositioning movements of the tool or power operated device in the vicinity of the particular working location at which it was initially positioned by movement of the carriage 30 along guide or track 22 and carriage or fixture 26 vertically relative to track 25. For example, it may be desired to step the tool, once located at a particular spatial location in a particular direction or directions to perform a plurality of operations relative to a work piece located thereat. The functions of drilling a plurality of holes in a line or in any predetermined array, applying a plurality of fasteners or assembling components with the work piece in spaced-apart relationship, stepping a power operated device such as a welding tool, inspection tool, or the like may be required whereby return of the tool transport 24 to said home position each time the tool operates would result in the waste of a substantial amount of time. Accordingly, means are provided in FIG. 4 for modifying the control apparatus of FIG. 3 to permit any of the described tool positioning and/or operating servo motors to operate a plurality of times during a single cycle to perform predetermined operations on a work piece in the realm of the tool or tools positioned by said transport means.

While means are provided in FIG. 4 for automatically controlling the predetermining controller P$r$CMx in a manner to be described, it is noted that a plurality of said controllers including others thereof as described may be similarly controlled in sequence in a predetermined cycle as defined by the composition of the command control message passed through switches 66 and 68. The pulse presettable predetermining counter P$r$CMx is preset by a portion of a first of the command control messages reproduced from a first channel or track of recording member 65. Feedback signals generated by motor Mx uncount P$r$CMx and result in a first control signal being generated on the output of P$r$CMx upon attaining its uncount condition. Said signal is transmitted to the stop control S of Mx and to an AND switching circuit 57e. The other input to 57e is connected to the output of a bi-stable switch 56e having an input which is one of the outputs of rotary control switch 68. The controller switch 56e preferably comprises a bi-stable switch operative when energized by a pulse portion of the command control message passed through 68 thereto, to gate a power supply PS or continuous signal to an input of AND switching circuit 57e until an output control signal appears on the latter. Thus, if the command control message is so constructed as to activate 56e, uncounting of P$r$CMx will result in a signal generated on the output of the AND switching circuit which is passed to the tone or coded relay CR–4 controlling the position of the switching element rotary stepping switch 66. The command control message recorded on the next channel of recording drum 65 which is coupled to output line 66' of 66 is passed therethrough and is operative to step switch 68 by activating coded relay CR–3 the correct number of times prior to the passage of a pulse code or train to P$r$CMx again and a signal to the start control F of Mx or the reverse control thereof for repositioning carriage 30 and the tool thereof in a horizontal direction. Upon uncounting, P$r$CMx may be operative to perform any of the control functions hereinabove described which may include operation of one more of the power operated tools or devices.

In a similar manner, any of the other predetermining controllers P$r$CMz, P$r$CMR, P$r$CMT–1, P$r$CMT–2, etc. may be controlled in a predetermined manner to step the tool in any direction, cause it to travel a predetermined path, and/or predetermine its intermittent or continuous operation.

A second AND switching control circuit 57e' and flip-flop controller 56e' thereafter are shown operatively connected ot the output of P$r$CMx and 68 respectively for controlling the operation of any of the other servo motors described for positioning and/or operating the tools in the manner described. For example, assuming that the command control message does not contain a command portion to be passed through switch 68 to the input of 56e but does contain a portion which will be passed to 56e' when the arm of switch 68 is operatively coupled to the line or terminal thereof which is connected to 56e'. As a result, that servo or power operated device which is connected to the output of 57e' will become activated upon the uncount of P$r$CMx and may be controlled as described by generating feedback pulses with its operation which are fed to a respective predetermined controller.

In FIG. 2, control elements 117 and 118 in the form of limit switches or surface sensing devices were shown mounted on portions of the tool head or mount and were defined as operative to sense the surface of a work piece towards which the tool is transported and to effect further control of the movement of the tool upon becoming activated. A modification to the control system of FIG. 3 is illustrated in FIG. 5 in which limit switches 117 and 118 are illustrated as forming part of the control circuitry. It is, of course, assumed that in FIGS. 4 and 5, the other elements of the circuit not illustrated therein are provided in FIG. 3 and are present and are modified accordingly.

Limit switch 117 is assumed to be operative to sense vertically disposed surfaces of the work piece represented by the notation W1 and limit switch 118 is operative to sense horizontally disposed surfaces of the workpiece located below the tool which, in this modification, is moveable towards the workpiece from above. Either or both switches 117 and 118 may be operative to preposition the tool relative to the workpiece. Assuming that the tool is first being moved in a horizontal direction by operation of motor Mx and that limit switch 117 is so positioned that its actuator arm or sensing element will first engage a vertical or substantially vertical surface of a workpiece or other member adapted to be operated on or scanned by the tool. The motor Mx is first started by a portion of the command control message passed through switch 68 while the predetermining controller P$r$CMx has remained deactivated as the result of failure to receive presetting signals as a portion of the command control message. It is of course assumed that the tool or tool arm having switch 117 mounted thereon has previously been positioned at a desired vertical location by the predetermined operation and control of motor Mz. Upon approaching said vertical surface, the switch 117 becomes activated as the result of engagement of its actuator arm against the surface W1 of the workpiece or other element mounted in its path of travel. Closure or activation of switch 117 results in the generation thereby of a pulse signal and its transmission to the stop control S of motor Mx and one input of an AND switching circuit 57f. The other input to 57f is from a flip-flop controller 56f having a switching input connected to rotary stepping switch 68 and operative to become activated upon transmission thereto of a portion of the command control message. Thus if the command control message is operative to activate 56f, upon the activation of switch 117, motor Mx will stop and a pulse generated on the output of 57f will be transmitted to the relay CR–4 for stepping switch 66. As a result, the next command control message recorded on the drum 65 is reproduced therefrom and passed through switch 66 and gates portions of itself to those predetermining controllers and/or servo motor controls defined for cyclic operation in said next reproduced command control message. Similarly, if switch 118 is activated when it is driven against horizontal surface W2 by movement of the transport apparatus, it will generate a pulse on the output of AND switching circuit 57f provided that 56f has been energized by a portion of the command control message and will result in the generation of a new command control message for further controlling selected of the servo motors described.

Other features of the invention are noted as follows.

As stated, the tool transport fixture may be provided in a variety of machine configurations and may be floor, overhead, wall or machine mounted or movable on guide means secured to a plurality of such locations. Various configurations for such tools and fixtures are illustrated in my said abandoned application and vary from a single column subtending from an overhead track travelling carriage and having a tool such as a spray head or scanner mounted on an arm supported by a vertically moveable fixture to one or more tools movable at the end of an arm or assembly which is movable in a plurality of ways by pivoting, rotating, projecting, retracting and otherwise moving portions of the fixture with respect to each other and the carrier or mount supporting the entire assembly. Each assembly or moveable portion of the entire fixture may be power operated to rotate and/or translate by means of one or more servo-motors coupled thereto through gears or other drive means and mounted on said assembly or the adjacent assembly. Sequential control of the various servo motors to effect eventual prepositioning of the tool or tools as described or by modification to the control apparatus hereinabove provided. Such modifications may include the following which are intended to comprise part of this invention.

Signals reproduced from an erasable recording medium such as the magnetic recording drum 65 may be sequentially gated directly to the controls of one or more of the illustrated and described servo-motors used to position the fixture, tool and/or to operate said tool in a predetermined and programmed manner. Said signals may be utilized per se or generated as part of the described command control message to effect at least part of the control functions described by direct control of the servo coupled to the reproduction transducer reading drum 65. In other words, predetermining controllers PrC and MTC may be eliminated completely during a control cycle where the precision required in the operations of the apparatus is such that feedback signals are not required and the operations of the servo motors employed may be controlled by the duration or composition of the signal or signals reproduced from the recordings temporarily provided on member 65 by transmission thereto as described. A combination of fixture positional controls effected by one or more predetermining controllers as described and direct control of the tool operation itself by one or more signals reproduced directly from the drum 65 and transmitted directly to the motor or motors to be controlled in operating the tool, may be utilized for certain operations. This may be variably effected by operatively connecting those servo controls which are to be controlled by signals reproduced directed from the drum 65, to selected of the outputs of switch 68 which are coupleable to selected channels of drum 65 by signals reproduced from recordings on other channels. In other words, a command control message for a particular cycle is recorded on several channels and the latter portions of the message recorded on one channel are used to effect switching of output 66' of switch 66 to the next channel by energizing relay CR4 which activates solenoid S3 to switch 66 to the next position. Accordingly, line 66' is shown connected to the input circuit 68' through rotary switch 68 to relay CR–4 so that if the proper tone or code appears on the output of switch 66 as reproduced from one channel, CR4 will become activated and will switch 66 to the next channel thereof without the need for first stepping switch 68.

It was heretofore proposed that the master controller or computer generating messages for controlling the plurality of machines hereinabove described may be operative to simultaneously generate different command control messages to signal output thereof with each message composed of control signals of a frequency which is different from that of the other messages. By using such a system, the master controller or computer may be utilized simultaneously to control the operation of a plurality of different machines and/or to simultaneously transmit command control messages to respective recording devices at each machine. Accordingly, in FIG. 6 is shown further details of one form of such a system wherein the notation 80 refers to the message generating means or command control computer which is operative to simultaneously generate different command control messages on its output and transmit same via one or more communication channels defined by a carrier signal on power lines, radio or microwaves, a light ray communication system or an automatic wire communication system.

In FIG. 6, a command signal generating device 80 is located remote from a plurality of separate machines 90 which are denoted respectively by notations 90–1, 90–2, 90–3, etc. and may be operative to simultaneously or separately perform preprogrammed operations on a single work piece, assembly or a plurality of different work pieces or assemblies. A master controller 80 includes a plurality of recording units 81 each of which may be read by its respective reader 82. The recording units which are denoted 81–1, 81–2, 81–3, etc. may each comprise a separate magnetic tape recorder, disc recorder or drum recorder or device for feeding cards such as punched cads containing recordings of command control messages to respective of the readers or pickup transducers which are denoted by notations 82–1, 82–2, 82–3, etc. Each of the readers 82 is operatively connected to a respective tone signal generator which generators are denoted 83–1, 83–2, 83–3, etc. Each of the tone signal generators 83 is operative to generate a tone signal of a different frequency than the others when its input is energized by a signal generated on the output of the respective reader 82 to which it is connected. Thus, depending upon the manner in which the respective readers are operated to read recordings from the recording or record-containing units 81, command control messages may be separately or simultaneously generated on the output 84 of the command control computer 80 and transmitted by shortwave or by the illustrated communication system 85 to either the receivers or inputs 87 of all machines 90, selected groups 88 of machines or individual machines of the system. At each machine is provided a tone responsive relay 89 which is responsive to only those signals generated on the output 84 of the command control computer 80 of a specific tone or range of tones. Accordingly, all other tone responsive relays of the group denoted 89–1, 89–2, 89–3, etc. will not be so activated by the frequency signals to which they are not responsive and only that machine, group of machines or separate operating unit of a particular machine will be activated and controlled by the message or messages received by its tone responsive relay to which frequency or tone signals are responsive.

Depending on which controls or devices the tone responsive relays 89 are connected to activate, either separate machine tools, separate motors of a machine tool or groups of machine tools may be simultaneously activated to control their respective servos or machines by all messages which are generated and transmitted as signals of the same frequency.

Also shown in FIG. 6 are a plurality of input means for command control messages which input means correspond at least in part to the input devices 51 and 54 of FIG. 3 for manually or otherwise programming the command control computer. An input console 93 includes an input device 94 having a plurality of keys for push-button switches 94S for generatnig command control signals and also having means 94C for reading messages from a recording unit such as a tape, punched card or other means. The notation 94C may also comprise the output of a digital computer operative to generate predetermined command control messages in response to its own programming and/or input means thereto such as means for scanning drawings, finished articles, etc. The output 95 of keyboard-reel 94 is connected through a manually settable multiple output rotary switch 96 through a selected of a plurality of outputs 96-1, 96-2, 96-3, etc. each of which extends to the input side of a respective of the tone generators 83-1, 83-2, 83-3, etc. Accordingly, depending on the condition of switch 96, the operator of console 94 may transmit command control messages of a particular frequency on the output 84 to remotely control a selected of the multiple machines 90 when, for example, a new or special unit of work is present thereat.

The operator of console 93 may also generate new messages either by selectively depressing push-buttons of the bank of push-buttons 94S or causing unit 94 to read a recording member in the reading section 94C thereof. The output 95 is connected by a bi-stable switch 95S to either the switching device 96 or a second single input-multiple output switch 97 having a plurality of outputs 98-1, 98-2, 98-3, etc., each of which is connected to respective recording transducers 99-1, 99-2, 99-3, etc. operative to record signals on the recording members of the respective recording units 81. Thus, the operator of the system illustrated in FIG. 6 may either directly control the selected machine tool by selectively operating switches 96 and 94S or may change recordings provided in the recording units 81, depending on requirement variations therefore.

Each of the machines or machine tools 90 contains a sensing device 100 for sensing the presence of a work piece and generating one or more signals on its output upon effecting such sensing, said signals being operative to energize a respective tone generator 101 which generates a tone of a particular frequency associated with the machine containing the sensor. The tone generator 101 then generates a specific tone which it transmits by short-wave or wire to a plurality of tone responsive relays 102, each of which, denoted 102-1, 102-2, 102-3, etc. is operative to activate a particular reader unit 82 to read the recording provided on the respective recording unit or channel 81. In other words, each of the machines 90 is provided with means for sensing a unit of work fed thereto or therepast and for activating the reader of the command signal generator 80 associated therewith for generating a command control message for controlling the machine.

The sensing unit 100 of each machine or tool 90 may also be operative to sense different work pieces fed to the machine and to generate different tone or code signals depending on the nature of the work unit sensed thereby so as to activate a predetermined of the plurality of reading devices 82 for generating signals which are operative to effect control of the tool in performing predetermined operations on the particular work piece. In FIG. 7 there is shown elements of a system for identifying different units of work at each machine and generating feedback signals operative to activate the command control computer to generate and transmit command control messages of the specific frequencies to control the machine tool sensing the work.

While the automatic production apparatus defined in FIGS. 2 and 6 provide work sensing relays mounted on the tools for sensing the surface of a work unit as the tool and work approach each other, there is provided in FIG. 7 not only means for detecting the presence of a work unit or its carrier but also for discriminating between different types of work so that an associated command control recording may be reproduced from the master controller or computer for controlling operation of the tool in accordance with the particular unit of work present at the tool. A scanning unit 100 is disposed on or adjacent the tool such as on the tool head or its associated structure and comprises a plurality of individual sensors or scanners denoted 100-1A, 100-1B, 100-1C, etc. such as photoelectric relays mounted in respective housings 100′ one above the other and each adapted to scan along a different horizontal path or level and become energized when a sensitized marker 103 intersects the scanning axis of the particular scanner. The markers 103 may comprise retroreflective material which is disposed at certain levels along the sidewall of the work, work container or pallet while omitted from other scanning levels in a manner to define a particular coded array identifying or coding the work associated therewith. Each housing 100′ may contain, in addition to a photoelectric cell and associated control therefore, a light source adapted to project light along or adjacent the scanning axis of the cell so as to energize the cell when light is reflected back into the housing. The output of each scanner 100 is a signal passed to energize a respective tone or frequency generator 101 there being a different tone generator connected to each scanner and adapted to generate a signal of a frequency which is different from the frequencies of all other tone generators. The outputs of all generators 101 (denoted 101-1A, 101-1B, 101-1C, etc.) are all connected to a common line 104 which may comprise a wire or short wave communication channel extending to a plurality of tone or frequency responsive relays 102-1, 102-2, 102-3 etc. associated with respective of the readers 82-1, 82-2, 82-3, etc. of the command recordings provided on record members or in record playback units 81. Upon becoming energized, each of the tone relays 102 is operative to effect the reading of a particular command recording and the generation and transmission of the signal derived from reproducing said recording to the tool mounting the scanners 100 for properly controlling same to predeterminately operate on the work.

By providing an automatic production system as described and illustrated in FIGS. 6 and 7 in which different units of work may be identified by an identifying means operative to generate one or more frequency signals or signals made up of different frequencies or tones defining different coded arrays of same, and by providing a plurality of relay means each of which is responsive to different groups of frequencies or tone signals and each of which is operative to effect the generation of a different command control code or message, a plurality of machines such as tools, transfer devices and other means operative on or associated with work in process such as inspection devices, may be automatically operated to perform different operations on different units of work fed thereto with the operation being controlled by a single computer or controller.

Means other than the scanning and identifying means of FIG. 7 for identifying different units of work or types of work may also be used in place of the bank of relays 100 scanning sensitized or reflective markers. For example, a contour sensing means such as a cathode ray or laser beam scanning means employing a deflection controlled beam, may be used to provide one or more signals which may be digitized to provide coded identifying signals upon scanning work which coded signals may be fed to a computer such as 80 to effect generation of the desired message.

In the hereinabove presented description of the control systems operative to positionally control and preposition said power operative devices or tools, scanning to effect the generation of feedback signals has been described as a combination of photoelectric scanning of marks, grid lines or reflectors disposed along the track 22 extending in the X direction and the actuation of limit switches with rotation of the output drive shafts of the various servo motors, which if drive slippage is not present or cumulative, is indicative of movement or time of operation of the particular power driven device. It is noted that photoelectric or other forms of scanning or sensing marks or other devices disposed in the path of movement of the power operated device or on the shaft of its drive means may also be employed to electrically indicate movement and serve as a feedback signal generating means where so necessitated as pointed out hereinabove.

A latitude of modification, substitution and change is intended in the foregoing disclosure and it will be appreciated that features and concepts derived from the drawings may be employed in varying combinations to provide different systems and types of automatic production, inspection and maintenance apparatus depending on the particular operational requirements. Certain of the mechanical features of production and maintenance tooling are shown in my said abandoned application while other features may be derived, for example, by modifying not only the control system as hereinabove proposed but the tool and its transport means.

In the appended claims the term "command control message" is intended to include both analog and digital type messages as well as messages containing code portions of a fixed frequency and other portions of different frequency therefrom which may also be fixed or varied in a manner to operate code or tone responsive relays in the system. In some instances, some features of the invention will be used without a corresponding use of other features. It is intended that the appended claims be construed broadly and in a manner consistent with the spirit and scope of the disclosure herein.

I claim:

1. A remote controlled system for performing a plurality of preprogrammed machine operations comprising in combination:
   (a) a plurality of separately operable production machines each having at least one servo operative for performing programmed operations with respect to work in process,
   (b) control means for said servos including a different tone or frequency responsive relay for each servo with each relay being responsive to signals of different frequencies than the other relays,
   (c) master control means including means for generating a plurality of command control messages each of which is composed of signals which vary in frequency from the frequencies of the other message signals, there being at least one message of a frequency to which a respective one of said different tone relays is responsive,
   (d) a transmitting output means from said master control means for transmitting message signals on the communication channel coupled to said output means and the inputs to each of said machine servo tone relays, and
   (e) means for operating said master control means to simultaneously generate a plurality of said command control messages of different frequencies on said communication channel whereby messages of specific frequencies are received by and activate respective of said tone relays for simultaneously operating respective of said machines in predetermined manners.

2. An automatic machine tool control system comprising:
   (a) a plurality of machine tools,
   (b) control means for controlling said machine tools to perform preprogrammed operations on work,
   (c) master message generating means for generating and transmitting different command control messages to activate respective of said control means to control the operation of the machine tools,
   (d) said master message generating means including recording means for messages and read out means for reproducing recorded messages from said recording means,
   (e) first input means to said recording means of said master message generating means including a record playback means having at least one record member provided with a plurality of recordings of said command control messages,
   (f) means for reading said recordings of said record playback unit to generate said messages on said input to said master message generating means, and
   (g) second input means to said master message generating means including a manual input device having a plurality of manual operative switches for manually generating different messages in response to the selective operation of said manual input device.

3. A control system in accordance with claim 2 whereby said manual input device is selectively operable to generate new command control messages and effect the replacement therewith of recordings of selected messages previously provided on said record member of said master message generating means.

4. A control system in accordance with claim 2 including presettable predetermining control means associated with said machine tools, means for disseminating messages from said master message generating means to selectively preset said predetermining control mean, and means operative in response to signals generated by the machine tools as they operate for activating the preset predetermining control means thereof to effect automatic control of the tools.

5. An automatic production system comprising:
   a plurality of machine tools operative to perform preprogrammed operations on work-in-process,
   master control means including an erasable recorder having a plurality of command control messages and means for reproducing selected messages therefrom upon command,
   means for controlling the reproduction of selected messages from said recording means,
   a plurality of communication channels between said master control means and said machine tools for transmitting individual command control messages to each tool to control the tool in operating on work,
   means for relatively moving the work and tools,
   sensing means at each tool for generating a signal upon sensing the presence of a work piece when said work and tool are predeterminately positioned with respect to each other,
   said sensing means being operatively connected to said control means for said message reproduction means to cause a selected message to be reproduced and transmitted on a selected channel to operate the tool in predeterminately performing operations relative to said work piece.

6. A system in accordance with claim 5, wherein said master control means includes magnetic recording means for recording and reproducing signals defining said command control messages.

7. A system in accordance with claim 5, whereby said master control means includes a card reader for reading recordings contained on a plurality of cards and generating signals defining said command control messages.

8. A system in accordance with claim 5, including rotary stepping switch means in the output of said reproducing means for said recordings, said stepping switch means being operative to gate selected messages to respective of said communication channels for dissemination to selected of said machine tools.

References Cited

UNITED STATES PATENTS

| | | | |
|---|---|---|---|
| 2,947,203 | 8/1960 | Ausenda et al. | 77—5 |
| 3,280,659 | 10/1966 | Allen | 77—1 |
| 3,426,339 | 2/1969 | Rich et al. | 179—100.2X |
| 3,372,568 | 3/1968 | Lemelson | 214—11 |
| 1,631,927 | 6/1927 | Dietrich | 143—47X |

OTHER REFERENCES

Electronics — 4/54—"Telemetering System"—Schultheis, Jr., pgs. 172–5.

ANDREW R. JUHASZ, Primary Examiner

Z. R. BILINSKY, Assistant Examiner

U.S. Cl. X.R.

77—5; 83—71